Dec. 20, 1966 J. E. NOGA 3,292,678
CALIBRATED SCREW DRIVER
Filed Oct. 12, 1965 2 Sheets-Sheet 1
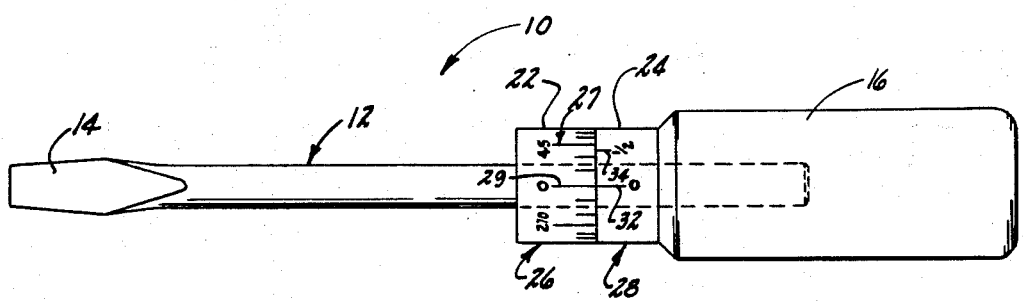
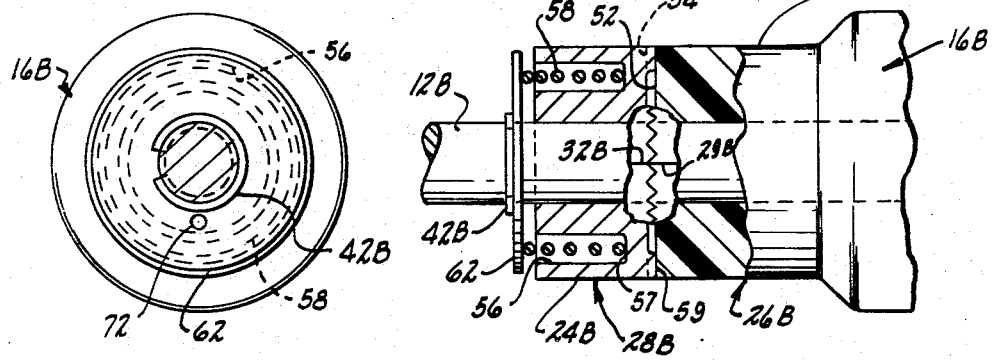
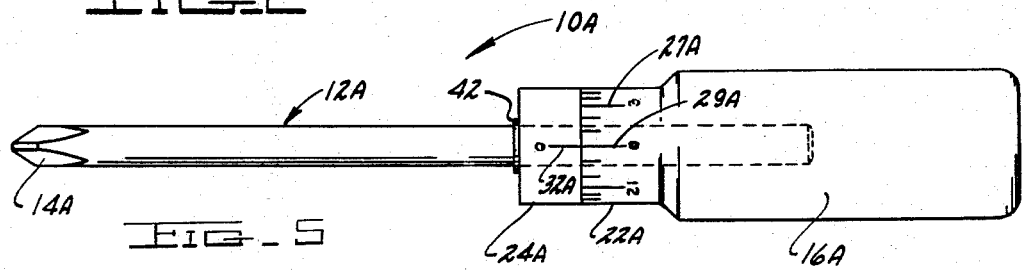
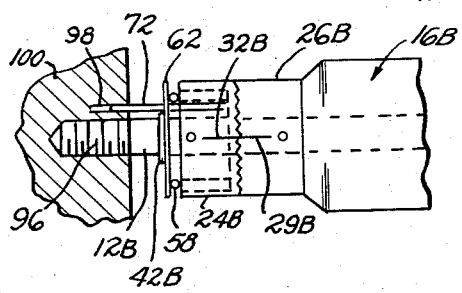
INVENTOR.
JOHN EDWARD NOGA
BY
ROBERT H. ELLIOTT Dec. 20, 1966  J. E. NOGA  3,292,678
CALIBRATED SCREW DRIVER
Filed Oct. 12, 1965  2 Sheets-Sheet 2

INVENTOR
JOHN EDWARD NOGA

United States Patent Office 3,292,678
Patented Dec. 20, 1966

3,292,678
CALIBRATED SCREW DRIVER
John Edward Noga, 14249 Darcey St.,
Detroit, Mich. 48233
Filed Oct. 12, 1965, Ser. No. 500,483
7 Claims. (Cl. 145—50)

The present invention is a continuation-in-part of copending application Serial No. 325,012, filed November 20, 1963, now abandoned and relates to new and useful improvements in hand tools and particularly to a new and unique screwdriver construction.

While the invention is basically simple, it provides a hand tool for utilitarian purposes which has heretofore not been available. In many occupations, such as those involving mechanics, electronics or hydraulics, it is necessary to rotate a threaded member a predetermined amount and then return the threaded member to the same position. The present invention makes possible this operation.

It is therefore a primary object of the present invention to provide a simple, durable and inexpensive hand tool in which the precise rotational displacement of a threaded member can be quickly and accurately determined.

Another object of the present invention is the provision of a hand tool as above described, wherein the rotational displacement can be readily determined, either visually or audibly.

The above and other objects can be accomplished by the provision of a hand tool having a generally round coupling shaft driving member with means on one end thereof to engage a threaded member; a handle grip member of larger diameter than said generally round coupling shaft driving member on the opposite end thereof; a first cylindrical member positioned on said round coupling shaft driving member intermediate the coupling shaft driving member and handle grip member; a second round section coaxial with said driving shaft and integral with said handle grip; said round section in alignment with said first cylindrical member, one end of said coupling shaft driving member is pressed into an opening in said handle grip member; said first cylindrical member is rotatably positioned on said round coupling shaft driving member with a snap ring; a washer disposed between said snap ring and said first cylindrical member; a compression spring interposed between said washer and the end of said first cylindrical member; the ends of said first and second cylindrical members are flat or they may have a plurality of radial serrations on the ends of said first cylindrical member and said second round section of the handle grip; calibrations on the outside diameter of each of said cylindrical members, disposed axial and in predetermined relationship; means on the end of said round shaft driving member cooperable with the head of a threaded member; a second coupling means depending from said first cylindrical member, through said washer and cooperable with an opening in the fixed member in which the threaded member is located.

Other objects of this invention will appear in the following description and appended claims, reference being had to the accompanying drawings forming a part of this specification wherein like reference characters designate corresponding parts in the several views.

In the drawings:

FIGURE 1 illustrates a hand tool which embodies the present invention and is shown in elevation.

FIGURE 2 is an elevational view of a modified hand tool.

FIGURE 3 is an enlarged view partially broken away of another modified form of the present invention.

FIGURE 4 is an end view of FIGURE 3, modified to illustrate another form of the invention.

FIGURE 5 is a side view of the modified form of the invention shown in FIG. 4 broken away to illustrate the threaded member and the fixed member.

Figure 6:
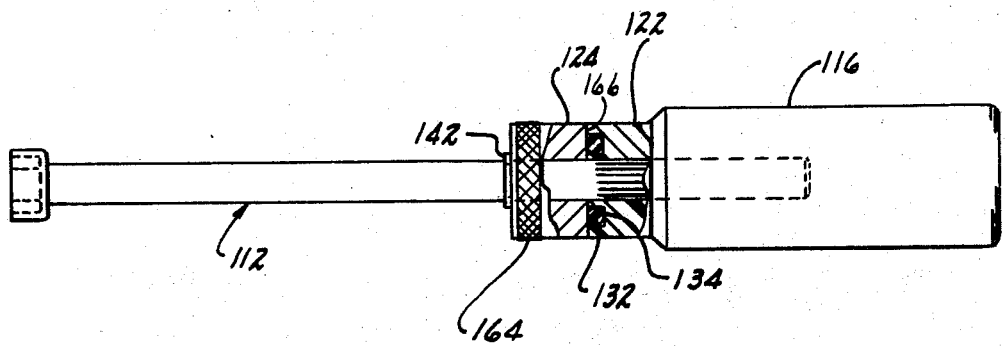
FIGURE 6 is another modified form of the present invention similar to FIGURES 1 and 2.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In FIGURE 1 of the drawings, we see a screwdriver assembly 10, wherein a round drive shaft 12 is formed to have a blade portion 14 on one end and a handle grip member 16 pressed onto the other end. Intermediate the handle grip member 16 and the blade portion 14 on shaft 12 are positioned two cylindrical members 22 and 24. The first cylindrical member 22 is pressed onto the round drive shaft 12, while the second cylindrical member 24 is rotatable thereon. Cylindrical member 22 and cylindrical member 24 both being positioned before the handle grip member 16 is pressed into position on the shaft 12. The outside diameter 26 of said first cylindrical member 22 has a plurality of axial calibrations thereon as indicated at 27. The calibrations are located in spaced relationship and may be graduated numerically or in a manner to determine angular relationship. The type of calibrations used is determined by the job in which the tool would be used. In some instances numerical calibration would suit the purpose, while in some other situation angular calibration might be more beneficial.

The second cylindrical member 24 which is rotatably mounted on the round shaft 12 has only two calibration marks on the outside diameter 28 thereof. The first calibration mark 32 is a zero indication, while the second calibration mark 34 is located in such a manner as to divide in half the calibrations on the first cylindrical member 22. By so doing, said second cylindrical rotatable member 24 in effect has doubled the number of calibrations on said first cylindrical member with the addition of one single calibration mark 34.

FIGURE 2 of the drawings illustrates a modified form of the present invention 10A, wherein a round drive shaft 12A has a Phillips head driver 14A substituted for the blade portion 14. The handle grip member 16A is substantially the same as used before, except that the calibrated cylindrical member 22A is integral therewith. The axial calibrations thereon are identified by numeral 27A. It will also be noted that the rotatable member 24A is mounted on said drive shaft 12A and is positioned with a resilient snap ring 42. The zero calibration on the rotatable member 24A is identified by numeral 32A and is shown in alignment with the zero calibration on the cylindrical portion 22A of handle grip 16A.

In FIGURE 3 of the drawings, a third modified form of the invention is illustrated. The enlarged portion shows the inner end 52 of the handle grip member 16B with serrations 54 about the circumference thereof, with similar serrations 56 on the cooperable rotatable member 24B to form a detent. The inside 56 of the rotatable cylindrical member 24B is undercut to receive a compression spring 58. One end of said compression spring 58 seats against the bottom 57 of the undercut section 56, while the opposite end thereof seats against a generally flat washer 62. The complete assembly is held in position on shaft 12B with a snap ring 42B. The outside diameter 28B of said rotatable member 24B and the outside diameter 26B of said cylindrical portion 22B of said handle grip member 16B is calibrated in substantially the same manner as previously described in connection with FIGURES 1 and 2. When the detent construction is used as shown in FIGURE 3, an audible sound is made when the handle grip member 16B is rotated with respect to said rotatable member.

The construction shown in FIGURE 4 of the drawings is substantially the same as the construction shown in FIGURE 3. FIGURE 4 is an end view of FIGURE 3, with one modification. The modification being a pin 72 which extends through the flat washer 62 and into the rotatable member 24B.

Pin 72 is adaptable to engage a similarly positioned opening 98 in the fixed member 100 into which the threaded member 96 is driven. This construction then renders the hand tool of the present invention a one handed tool, as opposed to the use of two hands when the other constructions are used.

FIGURE 6 of the drawings illustrates another modified form of the present invention, wherein a generally round driving shaft 112 is pressed into a generally cylindrical handle member 116. The handle grip member 116 is generally the same as that described in connection with FIGURE 2. The calibrated portion 122 is integral with the handle grip 116, while the left end thereof is generally flat, an undercut 132 has fitted therein, an O-ring. The O-ring 134 is adapted to engage the flat end surface 166 of the cylindrical member 124, which is positioned with the snap ring 142 secured to the shaft 112. Thus, the O-ring 134 frictionally limits rapid rotation of the member 124 and also prevents accidental displacement of the cylindrical member 124 once the rotation thereof has ceased. A knurled section 164 is provided for ease of operation.

Figure 7:
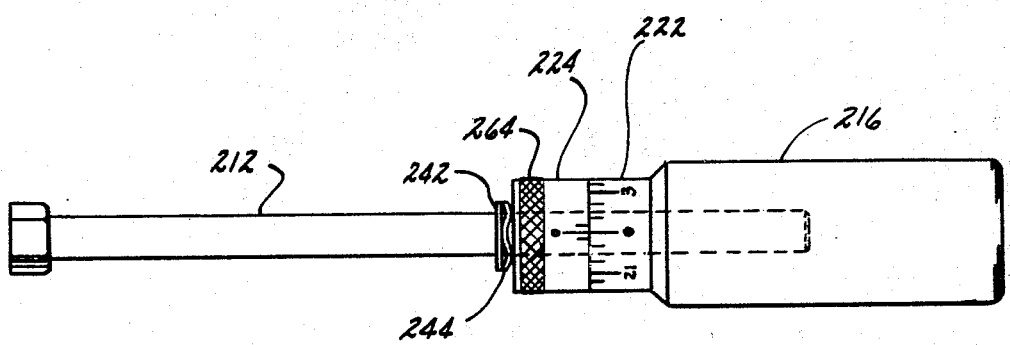
FIGURE 7 is still another modified form of the invention.

In FIGURE 7 of the drawings, a round driving member 212 is pressed into the cylindrical handle grip member 216. The calibrated portion 222 is integral with the handle grip member 216. It will be noted that each of the ends of the handle grip member is flat, as are each of the ends of the cylindrical member 224. The right end of the cylindrical member 224 is positioned in engagement with the left end of the handle grip member 216 by means of a spring washer 244 interposed between the snap ring 242 and the left end of member 224. The snap ring 242 engages a groove in the round driver member 212. A raised knurled portion on the outside diameter of the cylindrical member 224 is provided for ease of operation. Should additional friction be required, a friction material such as sheet cork can be secured to one of the flat ends of the engaging surfaces of member 216 or 224.

From the foregoing description, it is quite apparent that the present invention is simple, durable and relatively inexpensive to manufacture using modern mass production methods. Additionally, the above described hand tool is a precision hand tool which meets space age requirements. By the use of the hand tool of the present invention, a simple screw is transformed into a precision adjusting means, without necessity of calibration. In conventional tooling where calibrated screws are now used, they can now be discarded and standard screws substituted, thus saving large sums of money. Engineers, scientists, electronic technicians, mechanics and many others will find the hand tool of the present invention, a necessity in their tool box, as will the amateur inventor. In space age technology, the use of the hand tool of the present invention will permit many components to be reduced substantially in size, as well as weight and cost. This, while it is a simple invention, it is not one to be overlooked.

Having thus described my invention, I claim:

1. In a portable hand tool in the form of a calibrated screw driver to measure relative displacement of a threaded member with respect to a fixed member, the combination of, a driving member with means on one end thereof to engage a threaded member;
a handle grip member secured on the end of said driving member;
a cylindrical member rotatably positioned on said driving member intermediate the ends thereof;
said cylindrical member coaxial with said handle grip member;
a plurality of radial serrations on the cooperating ends of said cylindrical member and said handle grip member;
said cylindrical member secured to said coupling member for rotation thereon;
a washer disposed on said driving member intermediate a snap ring and said cylindrical member;
a compression spring positioned between said washer and said cylindrical member;
a pin depending from said cylindrical member and through said washer for engagement with a fixed member into which a threaded member is installed with said driving means, said threaded member and pin being in parallel relationship;
a plurality of calibrations on the outside of said cylindrical member and said handle grip member, displacement of the respective parts providing an audible sound when said tool is used in the dark.

2. In a hand tool, the combination of,
a driving member;
a substantially cylindrical handle grip member of generally symmetrical configuration;
an opening in said handle grip member to receive said driving member;
a groove in said driving member;
a flat ended cylindrical member positioned on said driving member intermediate said handle grip member and said groove;
calibrated indicia on the outside diameter of said cylindrical member;
at least one calibration on said handle grip member;
an O ring groove in the flat end surface of said handle grip member;
an O ring in said groove;
and a snap ring positioned in said driving member groove for positioning said calibrated cylindrical member, said O ring creating a frictional drag between the respective parts.

3. In a hand tool, the combination of,
a driving shaft member;
a substantially cylindrical handle grip member of generally symmetrical configuration and having flat ends;
an opening in said handle grip member for receiving said driving shaft member;
a groove in said driving shaft;
a flat ended cylindrical member positioned on said driving shaft member intermediate said handle grip and said groove;
calibrated indicia on the outside of one cylindrical member;
at least one calibration on the outside diameter of said remaining cylindrical member;
a spring washer, said spring washer interposed between said groove in said driving shaft and the snap ring which engages same so as to maintain the flat end on said cylindrical member in engagement with the flat end on said handle grip member;
said surface engagement providing a frictional drag between the respective parts.

4. A device as in claim 3, wherein a sheet of friction material is secured to one of said flat engaging surfaces to provide an additional frictional resistance.

5. In a rotary hand tool which is calibrated, the combination of,
a generally round shaft member;
a flange on said round shaft member intermediate the ends thereof;

a calibration mark on said flange;
a calibrated cylindrical member positioned on said round shaft member in alignment with said flange;
a cylindrical handle grip member;
a blind opening in said handle grip member for receiving one end of said generally round shaft member;
the end of said generally round shaft member is pressed into said blind opening in said handle member until said calibrated cylindrical member is frictionally engaged between the respective surfaces of said flange and the end of said cylindrical handle member, while the free end of said round shaft has a driving means on the end thereof for engaging a threaded member such as a screw.

6. In a calibrated screwdriver for manual usage, the combination of,
a driving shaft member;
a narrow groove in said driving shaft member about the outer surface thereof, intermediate the ends;
a snap ring in said groove forming a stop flange;
a cylindrical member having an opening therein positioned on said driving shaft in engagement with said snap ring;
two spaced calibrations on said cylindrical member;
a cylindrical handle member;
a blind opening in said handle member for receiving one end of said driving shaft member;
calibrations on the circumference of said handle member;
the end of said driving shaft member is pressed into said blind opening in said cylindrical handle until said cylindrical member engages the end of said calibrated handle member to provide frictional resistance between the respective parts, while the free end of said shaft member is in the form of a screwdriver.

7. In a screwdriver construction, the combination of,
a round driving shaft member;
a narrow groove in the circumference of said round driving shaft member intermediate the ends thereof;
a snap ring in said narrow groove which forms a stop flange;
a rotatable sleeve member positioned on said round driving member in coaxial relationship therewith;
spaced axial calibrations about the circumference of said rotatable sleeve member;
a cylindrical handle member having substantially the same dimension as the rotatable sleeve member;
a calibration mark on said cylindrical handle member;
a blind opening in said cylindrical handle member for receiving one end of said driving shaft member;
the end of said driving member adjacent said rotatable sleeve is pressed into said blind opening until the rotatable sleeve is engaged between the snap ring and the handle with sufficient frictional resistance to rotation to prevent indiscriminate movement thereof when in use.

References Cited by the Examiner

UNITED STATES PATENTS

| | | |
|---|---|---|
| 922,080 | 5/1909 | Bowers. |
| 1,345,443 | 7/1920 | Hood _____ 145—50 |
| 2,018,549 | 10/1935 | Ekdahl _____ 33—166 X |
| 2,549,332 | 4/1951 | Parker. |

FOREIGN PATENTS 913,388   12/1962   Great Britain.

WILLIAM FELDMAN, *Primary Examiner.*

R. V. PARKER, JR., *Assistant Examiner.*